(12) United States Patent
Sugiyama

(10) Patent No.: US 10,907,855 B2
(45) Date of Patent: Feb. 2, 2021

(54) AIR-CONDITIONING APPARATUS

(71) Applicant: Mitsubishi Electric Corporation, Tokyo (JP)

(72) Inventor: Daisuke Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/301,214

(22) PCT Filed: Aug. 10, 2016

(86) PCT No.: PCT/JP2016/073526
§ 371 (c)(1),
(2) Date: Nov. 13, 2018

(87) PCT Pub. No.: WO2018/029797
PCT Pub. Date: Feb. 15, 2018

(65) Prior Publication Data
US 2019/0285307 A1   Sep. 19, 2019

(51) Int. Cl.
*F24F 11/64* (2018.01)
*F24F 11/79* (2018.01)
*F24F 11/65* (2018.01)
*G05D 23/27* (2006.01)
*F24F 120/12* (2018.01)
(Continued)

(52) U.S. Cl.
CPC .............. *F24F 11/79* (2018.01); *F24F 11/64* (2018.01); *F24F 11/65* (2018.01); *G05D 23/27* (2013.01); *F24F 13/10* (2013.01); *F24F 13/1413* (2013.01); *F24F 13/15* (2013.01); *F24F 2120/12* (2018.01);
(Continued)

(58) Field of Classification Search
CPC ........ F24F 11/79; F24F 2120/20; F24F 11/65; G05D 23/27
See application file for complete search history.

(56) References Cited

U.S. PATENT DOCUMENTS

| | | | |
|---|---|---|---|
| 8,103,384 B2* | 1/2012 | Matsumoto | F24F 11/30 700/276 |
| 2013/0289777 A1* | 10/2013 | Koizumi | G05D 23/19 700/276 |
| 2015/0377242 A1* | 12/2015 | Furuhashi | F24F 11/79 415/148 |

FOREIGN PATENT DOCUMENTS

| | | |
|---|---|---|
| JP | H02-146450 A | 6/1990 |
| JP | H04-320747 A | 11/1992 |

(Continued)

OTHER PUBLICATIONS

International Search Report dated Oct. 4, 2016 issued in corresponding international patent application No. PCT/JP2016/073526.
(Continued)

*Primary Examiner* — Elizabeth J Martin
*Assistant Examiner* — Nael N Babaa
(74) *Attorney, Agent, or Firm* — Posz Law Group, PLC

(57) ABSTRACT

In a related-art air-conditioning apparatus, air is conditioned while an airflow direction or an airflow is directed to a position of a human body detected by a human body detection sensor, and hence the same air-stream control is performed for both of a person who feels comfortable and a person who feels hot. An air-conditioning apparatus according to the present invention can adjust an angle of an airflow-direction flap in accordance with a thermal sensation level, and hence air-stream control matching thermal sensation of a human body can be performed.

17 Claims, 14 Drawing Sheets

(51) Int. Cl.
- *F24F 13/10* (2006.01)
- *G01J 5/00* (2006.01)
- *F24F 13/15* (2006.01)
- *F24F 120/20* (2018.01)
- *F24F 13/14* (2006.01)

(52) U.S. Cl.
CPC ....... *F24F 2120/20* (2018.01); *F24F 2221/38* (2013.01); *G01J 5/0025* (2013.01)

(56) References Cited

FOREIGN PATENT DOCUMENTS

| | | |
|---|---|---|
| JP | 2009-184549 A | 8/2009 |
| JP | 2012-037172 A | 2/2012 |
| JP | 2012-072965 A | 4/2012 |
| WO | 2015/122201 A1 | 8/2015 |

OTHER PUBLICATIONS

Office Action dated Apr. 24, 2020 issued in corresponding CN patent application No. 201680087328.9 (and English translation).
Office Action dated Sep. 14, 2020 issued in corresponding CN patent application No. 201680087328.9 (and English translation).

\* cited by examiner

| HUMAN BODY SURFACE TEMPERATURE | INDEX | THERMAL SENSATION LEVEL (HEATING) | AIRFLOW-DIRECTION FLAP ADJUSTMENT ANGLE (HEATING) |
|---|---|---|---|
| BELOW 31.5°C | VERY COLD | 1 | 0° |
| 31.5 TO 32.4°C | COLD | 2 | 0° |
| 32.5 TO 33.4°C | COMFORTABLE | 3 | 0° |
| 33.5 TO 34.4°C | HOT | 4 | 5° |
| 34.5°C OR ABOVE | VERY HOT | 5 | 10° |

AIR-CONDITIONING APPARATUS

CROSS REFERENCE TO RELATED APPLICATION

This application is a U.S. national stage application of International Application No. PCT/JP2016/073526, filed on Aug. 10, 2016, the contents of which are incorporated herein by reference.

TECHNICAL FIELD

The present invention relates to an air-conditioning apparatus configured to determine thermal sensation of a human body, through use of a human body detection sensor, and to control an airflow depending on the thermal sensation.

BACKGROUND

Hitherto, there has been proposed an air-conditioning apparatus configured to detect a human body by using, for example, a human body detection sensor and control an airflow toward a direction of the human body, to thereby enhance the level of comfort (for example, see Patent Literature 1).

PATENT LITERATURE

Patent Literature 1: Japanese Unexamined Patent Application Publication No. 2012-072965

In the air-conditioning apparatus of Patent Literature 1, air is conditioned while the airflow direction or the airflow is directed to a position of the human body detected by the human body detection sensor, and hence the same air-stream control is performed for both of a person who feels comfortable and a person who feels hot or cold. Therefore, in some cases, comfortable air-stream control is not performed for a person who feels hot at the time of heating operation or a person who feels cold at the time of cooling operation.

SUMMARY

The present invention has been made to overcome the above-mentioned problem, and has an object to provide an air-conditioning apparatus configured to perform air-stream control matching thermal sensation of a human body.

According to one embodiment of the present invention there is provided an air-conditioning apparatus, including: a casing having an air inlet and an air outlet; a fan, which is provided inside the casing, and is configured to suck air in an indoor space through the air inlet and blow out the air through the air outlet; a heat exchanger, which is provided inside the casing, and is configured to condition the air sucked through the air inlet; an airflow-direction flap configured to control an airflow direction of an airflow to be blown out through the air outlet; a human body detection sensor configured to detect human body information of the indoor space; and a controller configured to control an operation of the airflow-direction flap, the controller including: a position determination unit configured to detect a position of a human body in the indoor space based on the human body information detected by the human body detection sensor; a thermal sensation level determination unit configured to determine a thermal sensation level based on the human body information; and an airflow-direction and airflow-reaching position control unit configured to adjust an angle of the airflow-direction flap in accordance with the thermal sensation level determined by the thermal sensation level determination unit.

According to the air-conditioning apparatus of one embodiment of the present invention, the angle of the airflow-direction flap is adjusted in accordance with the thermal sensation level of the human body. Thus, the intensity of air conditioning can be adjusted depending on thermal sensation of a person, and comfortable air conditioning can be provided to a person in a room.

DETAILED DESCRIPTION

Embodiment 1

Figure 1:
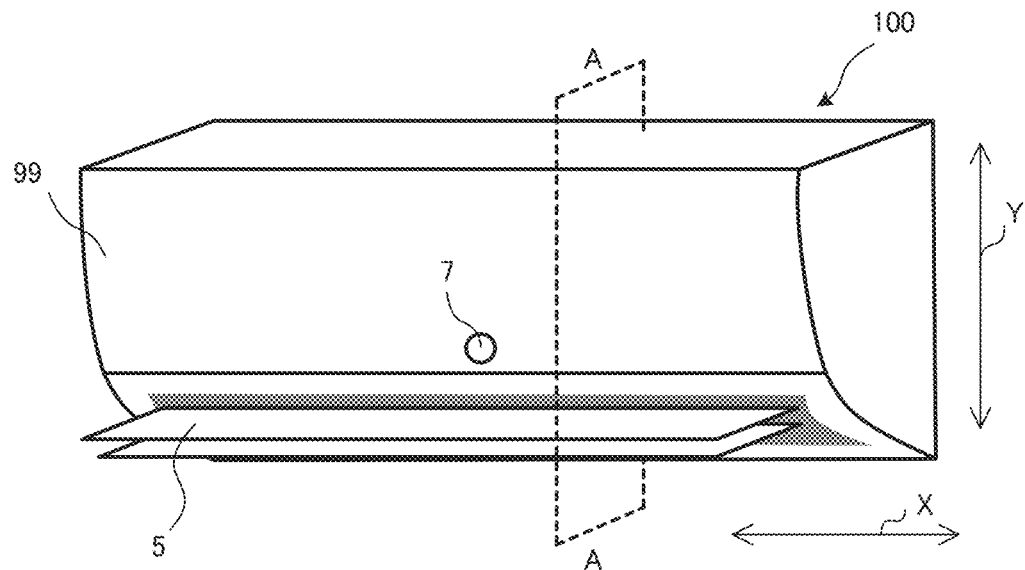
FIG. 1 is a perspective view for illustrating an outer appearance of an indoor unit of an air-conditioning apparatus according to Embodiment 1 of the present invention.
Figure 2:
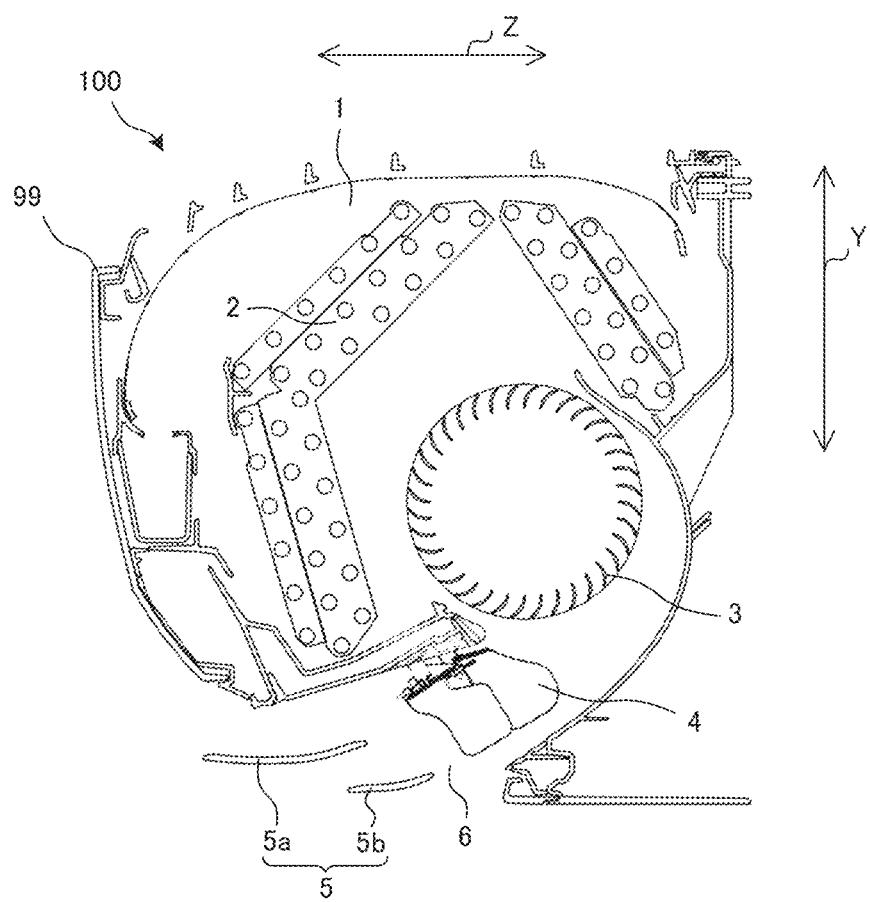
FIG. 2 is a sectional view for illustrating an A-A cross section of the indoor unit of FIG. 1.

FIG. 1 is a perspective view for illustrating an outer appearance of an indoor unit of an air-conditioning apparatus according to Embodiment 1 of the present invention. Further, FIG. 2 is a sectional view for illustrating an A-A cross section of the indoor unit of FIG. 1. An indoor unit 100 of FIG. 1 is connected to an outdoor unit (not shown) by a refrigerant pipe to construct a refrigerant circuit.

The indoor unit 100 includes a casing 99, a heat exchanger 2 provided inside the casing 99, a fan 3, and airflow-direction flaps, and is installed in an indoor space corresponding to an air-conditioning target space. The casing 99 has an air inlet 1 on an upper side thereof and an air outlet 6 on a lower side thereof to form an air passage connecting between the air inlet 1 and the air outlet 6.

The fan 3 is formed of, for example, an elongated cylindrical cross-flow fan, and its longitudinal direction is arranged to match a horizontal direction of the casing 99. The fan 3 sucks indoor air through the air inlet 1, and blows out conditioned air through the air outlet 6. The heat exchanger 2 is formed of, for example, a refrigerant pipe and a large number of fins arrayed to cross the refrigerant pipe, and is shaped to surround front and upper sides of the fan 3. The heat exchanger 2 conditions indoor air taken into the casing 99 by the fan 3 to generate conditioned air. The heat exchanger 2 functions as an evaporator at the time of cooling operation to cool the air, and functions as a condenser at the time of heating operation to heat the air.

Further, as illustrated in FIG. 2, the indoor unit 100 includes the airflow-direction flaps. The airflow-direction flaps control the airflow direction of the airflow blown out to the indoor space through the air outlet 6. The airflow-direction flaps include a horizontal airflow-direction flap 4 and a vertical airflow-direction flap 5. The horizontal airflow-direction flap 4 is mounted in the middle of an air passage extending from the fan 3 to the air outlet 6 to be turnable in a horizontal direction, and controls the airflow direction of the airflow in the horizontal direction (arrow X direction). The vertical airflow-direction flap 5 is mounted at the air outlet 6 to be turnable in a vertical direction, and controls the airflow direction of the airflow in the vertical direction (arrow Y direction). The vertical airflow-direction flap 5 includes, for example, a front vertical airflow-direction flap 5a provided on the front side of the indoor unit 100 in a front-rear direction (arrow Z direction), and a rear vertical airflow-direction flap 5b provided on the rear side thereof. The horizontal airflow-direction flap 4 is formed of a plurality of vanes arrayed in the horizontal direction (arrow X direction). The horizontal airflow-direction flap 4 is connected to a horizontal airflow-direction flap drive motor, and the horizontal airflow-direction flap drive motor drives to turn the horizontal airflow-direction flap 4. The vertical airflow-direction flap 5 is connected to a vertical airflow-direction flap drive motor, and the vertical airflow-direction flap drive motor drives to turn the vertical airflow-direction flap 5 the vertical airflow-direction flap 5.

Further, the air-conditioning apparatus includes a human body detection sensor 7 configured to detect human body information of human body in the indoor space. The human body information includes, for example, information on position and temperature of a human body. The human body detection sensor 7 is formed of an infrared sensor or other non-contact temperature sensors, and acquires a thermal image of the indoor space.

Figures 3, 4:
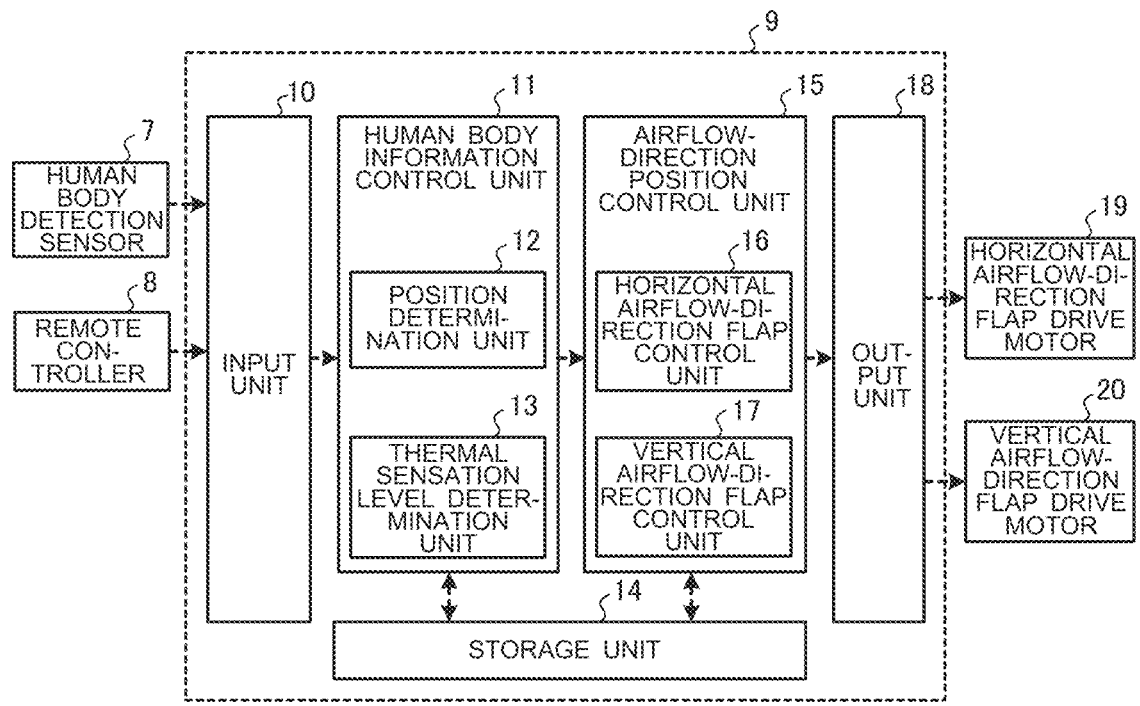
FIG. 3 is a functional block diagram for illustrating a controller in Embodiment 1 of the present invention.
FIG. 4 is a table for showing an example of a setting table stored in a storage unit in Embodiment 1 of the present invention.

FIG. 3 is a functional block diagram for illustrating a controller in Embodiment 1 of the present invention. A controller 9 is formed of, for example, a microcomputer. The controller 9 controls the operation of the airflow-direction flaps based on signals acquired from, for example, a remote controller 8 and the human body detection sensor 7 to control the airflow to be blown out into the room.

The controller 9 includes an input unit 10, a human body information control unit 11, an airflow-direction and airflow-reaching position control unit 15, a storage unit 14, and an output unit 18. The input unit 10 processes input information, for example, operation commands such as an operation mode, setting temperature, setting humidity, and air velocity setting, which are input by a user via the remote controller 8, and the thermal image acquired from the human body detection sensor 7. The human body information control unit 11 acquires the input information from the input unit 10 to process the human body information. The airflow-direction and airflow-reaching position control unit 15 acquires the human body information or other information from the human body information control unit 11 to process an airflow-direction and airflow-reaching position. The storage unit 14 is formed of, for example, a memory, and stores various control setting values. The output unit 18 acquires control information or other information from the airflow-direction and airflow-reaching position control unit 15 to transmit the information to an apparatus outside of the controller 9.

The human body information control unit 11 includes a position determination unit 12 and a thermal sensation level determination unit 13, and extracts human body information from the thermal image of the indoor space obtained by the human body detection sensor 7. Specifically, the position determination unit 12 checks the thermal image of the indoor space against the control setting value stored in the storage unit 14 to determine at which position in the room a human body is present. The thermal sensation level determination unit 13 determines a thermal sensation level of a human body, which indicates thermal sensation of a human body. The thermal sensation level determination unit 13 specifically detects a surface temperature of a human body to compare the detected surface temperature of the human body with the control setting value stored in the storage unit 14, to thereby determine the thermal sensation level of the human body.

The airflow-direction and airflow-reaching position control unit 15 includes a horizontal airflow-direction flap control unit 16 configured to control the orientation of the horizontal airflow-direction flap 4, and a vertical airflow-direction flap control unit 17 configured to control the direction of the vertical airflow-direction flap 5. The airflow-direction and airflow-reaching position control unit 15 sets the airflow-direction and airflow-reaching position based on information such as the human body position and the thermal sensation level acquired from the human body information control unit 11. The horizontal airflow-direction flap control unit 16 refers to the control setting value stored in the storage unit 14 to determine the angle of the horizontal airflow-direction flap 4 so that the airflow-direction and airflow-reaching position set by the airflow-direction and airflow-reaching position control unit 15 is achieved. Similarly to the horizontal airflow-direction flap control unit 16, the vertical airflow-direction flap control unit 17 also refers to the control setting value stored in the storage unit 14 to determine the angle of the vertical airflow-direction flap 5.

When the output unit 18 acquires control information related to the airflow direction from the airflow-direction and airflow-reaching position control unit 15, the output unit 18 outputs control signals to a horizontal airflow-direction flap drive motor 19 and a vertical airflow-direction flap drive motor 20. The rotation speed of the horizontal airflow-direction flap drive motor 19 is controlled based on the control signal received from the controller 9 so that the horizontal airflow-direction flap 4 is driven. Similarly, the rotation speed of the vertical airflow-direction flap drive motor 20 is controlled based on the control signal received from the controller 9 so that the vertical airflow-direction flap 5 is driven.

FIG. 4 is a table for showing an example of a setting table 30 stored in the storage unit in Embodiment 1 of the present invention. The storage unit 14 stores, as one of the control setting values, the setting table 30 in which a human body temperature, a thermal sensation index, the thermal sensation level, and an airflow-direction flap adjustment angle are associated with each other as shown in FIG. 4. The setting table 30 classifies the human body temperature into a plurality of stages of thermal sensation levels, and associates a preset adjustment amount with each of a plurality of stages of thermal sensation levels. The setting table 30 is referred to when the thermal sensation level determination unit 13 determines the thermal sensation level and when the airflow-direction and airflow-reaching position control unit 15 determines the adjustment amount of the airflow-direction and airflow-reaching position, for example.

In FIG. 4, the higher the human body surface temperature is, the higher an index representing thermal sensation of a person's hot feeling is associated therewith. For example, the index of the thermal sensation has five stages of: very cold; cold; comfortable; hot; and very hot in the order from a lower human body surface temperature. Further, in the setting table 30 related to the heating operation, for example, the higher the degree of hot feeling the index of the thermal sensation indicates, the higher a level value of the thermal sensation level is set, and the larger a required adjustment angle is set. For example, in FIG. 4, thermal sensation levels of level 1, level 2, level 3, level 4, and level 5 are associated in the order from the thermal sensation index indicating a cold feeling. Further, for each of the thermal sensation levels of from level 1 to level 3, an adjustment angle of 0 degrees is set, and for the thermal sensation levels of level 4 and level 5, adjustment angles of 5 degrees and 10 degrees are set, respectively. That is, when the thermal sensation level (level 3) of a case in which the index of the thermal sensation indicates comfortable is set as a reference level, an adjustment angle of 0 degrees is set for the thermal sensation level that is equal to or lower than the reference level. Thus, when the thermal sensation level is from level 1 to level 3, the airflow reaching position is the same before and after the adjustment of the airflow-direction and airflow-reaching position. In FIG. 4, when the human body surface temperature detected by the thermal sensation level determination unit 13 at the time of heating operation is 33.8 degrees Celsius, it is determined that the index of the thermal sensation is hot, the thermal sensation level is 4, and the adjustment angle is 5 degrees.

The horizontal airflow-direction flap control unit 16 and the vertical airflow-direction flap control unit 17 control the horizontal airflow-direction flap drive motor 19 and the vertical airflow-direction flap drive motor 20, respectively, so that the airflow reaches the detected human body position. After the airflow is directed to the human body position, the horizontal airflow-direction flap control unit 16 further outputs control information to adjust the horizontal airflow-direction flap 4. Then, the rotation speed of the horizontal airflow-direction flap drive motor 19 is controlled based on the received control signal so that the horizontal airflow-direction flap 4 is driven. The airflow reaching position moves to a position away from the human body position by an adjustment angle (5 degrees) in a left direction or a right direction.

Figure 5:
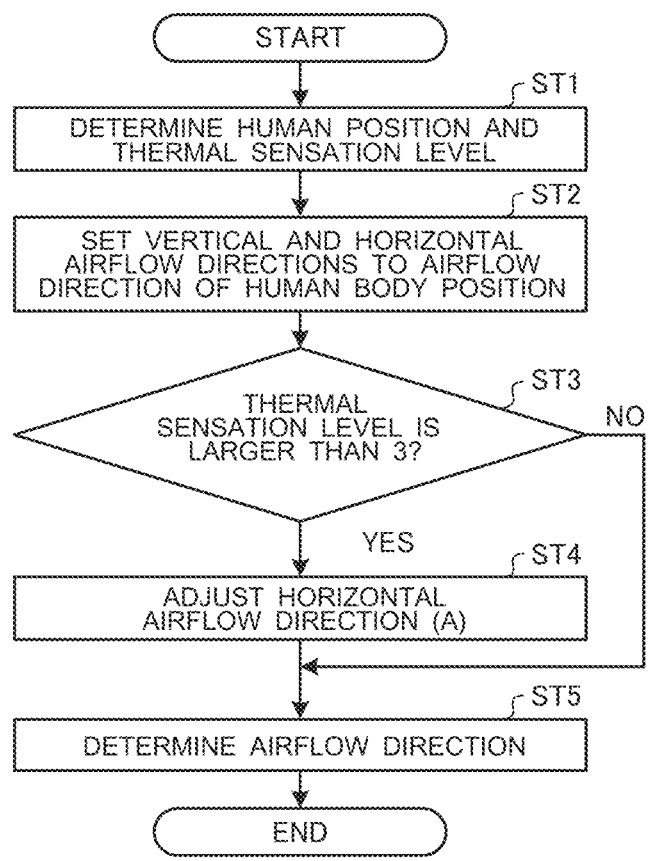
FIG. 5 is a flow chart for illustrating air-stream control to be performed by the controller in Embodiment 1 of the present invention.

FIG. 5 is a flow chart for illustrating the air-stream control to be performed by the controller in Embodiment 1 of the present invention. When the air-conditioning apparatus is operated to perform heating operation, the controller 9 performs the control flow of FIG. 5. First, based on the thermal image acquired by the human body detection sensor 7, the position determination unit 12 determines a position at which a human body is present in the room, and the thermal sensation level determination unit 13 determines the thermal sensation level of the human body from the surface temperature of the human body (Step ST1). Next, the horizontal airflow-direction flap control unit 16 sets the angle of the horizontal airflow-direction flap 4 via the horizontal airflow-direction flap drive motor 19, and the vertical airflow-direction flap control unit 17 sets the angle of the vertical airflow-direction flap 5 via the vertical airflow-direction flap drive motor 20 (Step ST2). At this time, the reaching position of warm air blown out into the room from the indoor unit 100 is directed to the human body position obtained in Step ST1.

Next, the airflow-direction and airflow-reaching position control unit 15 determines whether or not the thermal sensation level determined by the thermal sensation level determination unit 13 is higher than level 3 (Step ST3). That is, in Step ST3, with level 3 of the thermal sensation level being set as a preset reference level, the airflow-direction and airflow-reaching position control unit 15 determines whether or not a human body feels hot rather than comfortable.

When the thermal sensation level is higher than level 3 (Step ST3; YES), the airflow-direction and airflow-reaching position control unit 15 refers to the setting table 30 stored in the storage preset unit 14 to acquire an adjustment angle corresponding to the thermal sensation level, and notifies the horizontal airflow-direction flap control unit 16 of the adjustment angle. When the horizontal airflow-direction flap control unit 16 acquires the adjustment angle from the airflow-direction and airflow-reaching position control unit 15, the horizontal airflow-direction flap control unit 16 adjusts the determined angle of the horizontal airflow-direction flap 4 by the acquired adjustment angle (Step ST4). For example, when the thermal sensation level is 4, the angle of the horizontal airflow-direction flap 4 set in Step ST2 is changed by the adjustment angle (5 degrees) in a room center direction, that is, in a direction to face the indoor unit 100. Next, the control information of the horizontal airflow-direction flap control unit 16 is transmitted to the horizontal airflow-direction flap drive motor 19, and the horizontal airflow-direction flap drive motor 19 changes the angle of the horizontal airflow-direction flap 4 so that the airflow direction is determined (Step ST5). When the airflow direction is determined after the angle is adjusted in Step ST4, the warm-air reaching position is shifted from the human body position. Meanwhile, when the thermal sensation level is 3 or less in Step ST3, that is, when the index is comfortable, cold, or very cold (Step ST3; NO), the airflow direction is determined (Step ST5) without adjustment of the angle in Step ST4. In this case, the warm-air reaching position is the human body position.

When the air-conditioning apparatus is operated to perform heating operation, the control flow illustrated in FIG. 5 is repeatedly executed so that the airflow direction of the airflow is adjusted based on, for example, the position and the thermal sensation level of the human body.

Figure 6A:
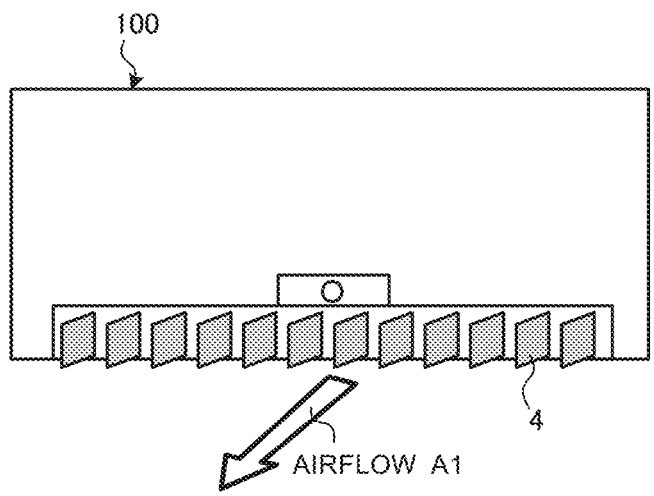
FIG. 6A is a front view for illustrating the indoor unit in Usage Example 1 of a horizontal airflow-direction flap in Embodiment 1 of the present invention.
Figure 6B:
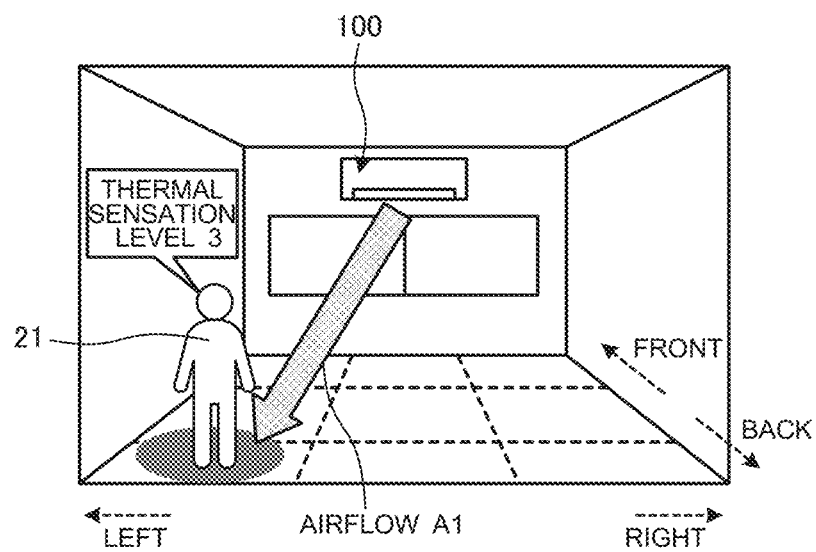
FIG. 6B is a schematic view for illustrating an inside of a room in Usage Example 1 of FIG. 6A.
Figure 7A:
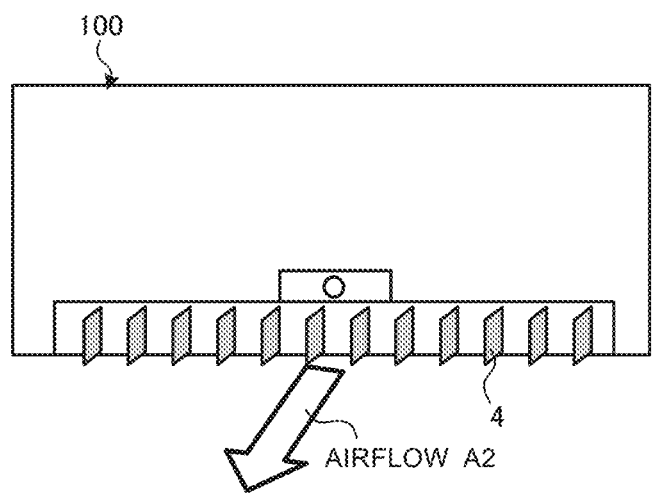
FIG. 7A is a front view for illustrating the indoor unit in Usage Example 2 of the horizontal airflow-direction flap in Embodiment 1 of the present invention.
Figure 7B:
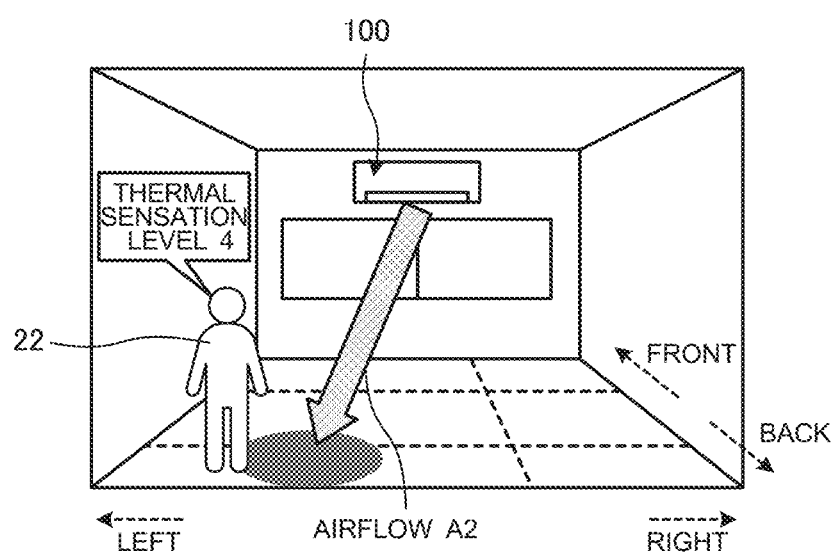
FIG. 7B is a schematic view for illustrating an inside of the room in Usage Example 2 of FIG. 7A.
Figure 8A:
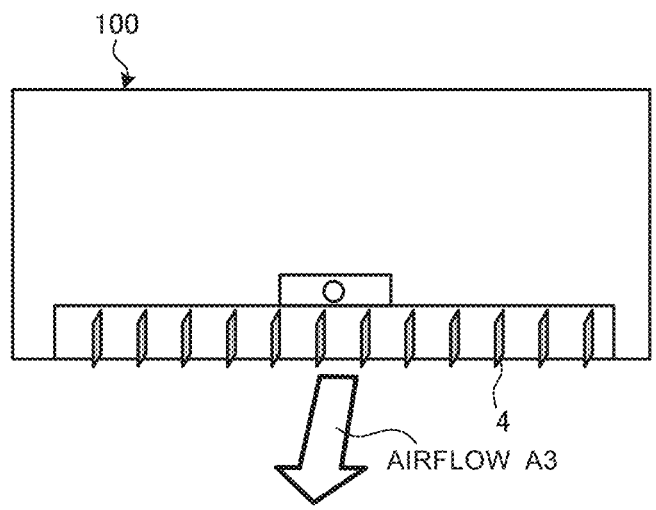
FIG. 8A is a front view for illustrating the indoor unit in Usage Example 3 of the horizontal airflow-direction flap in Embodiment 1 of the present invention.
Figure 8B:
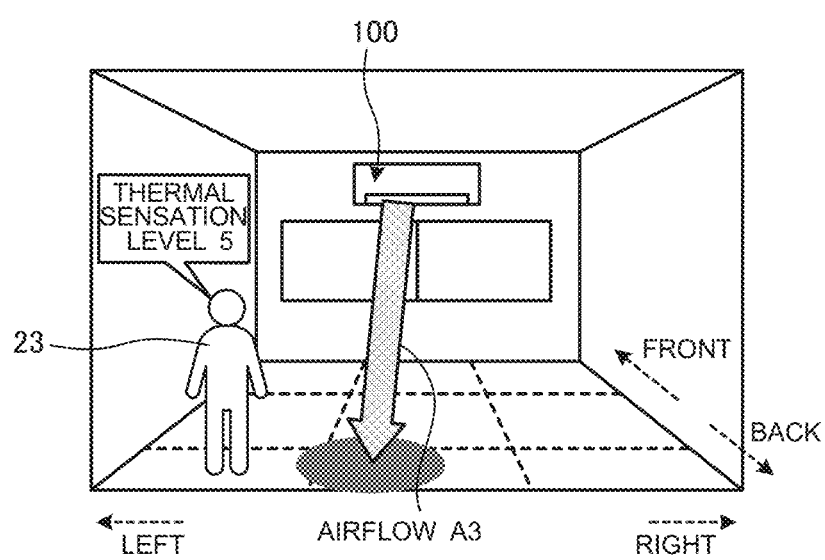
FIG. 8B is a schematic view for illustrating an inside of the room in Usage Example 3 of FIG. 8A.

Next, with reference to FIG. 6A to FIG. 8B, description is given of the airflow blown into the room from the indoor unit 100. FIG. 6A is a front view for illustrating the indoor unit in Usage Example 1 of the horizontal airflow-direction flap in Embodiment 1 of the present invention. FIG. 6B is a schematic view for illustrating an inside of a room in Usage Example 1 of FIG. 6A. FIG. 7A is a front view for illustrating the indoor unit in Usage Example 2 of the horizontal airflow-direction flap in Embodiment 1 of the present invention. FIG. 7B is a schematic view for illustrating an inside of the room in Usage Example 2 of FIG. 7A. FIG. 8A is a front view for illustrating the indoor unit in Usage Example 3 of the horizontal airflow-direction flap in Embodiment 1 of the present invention. FIG. 8B is a schematic view for illustrating an inside of the room in Usage Example 3 of FIG. 8A.

When the controller 9 operates the horizontal airflow-direction flap 4 to adjust the airflow direction in accordance with the thermal sensation level of the human body, airstream control is performed to obtain such airflows A1 to A3 as indicated by the arrows in FIG. 6A to FIG. 8B.

In FIG. 6A and FIG. 6B, there are illustrated the orientation of the horizontal airflow-direction flap 4 and the airflow A1 of a case in which a human body 21 having the thermal sensation level of 3 is present in the room. The horizontal airflow-direction flap 4 and the vertical airflow-direction flap 5 are controlled so that the airflow A1 reaching, for example, a foot position of the human body 21 is formed. At this time, the thermal sensation level of the human body 21 is level 3, and hence the warm air is supplied to around the feet of the human body 21 without adjustment of the horizontal airflow direction.

In FIG. 7A and FIG. 7B, there are illustrated the orientation of the horizontal airflow-direction flap 4 and the airflow A2 of a case in which a human body 22 having the thermal sensation level of 4 is present on the back left side in the room. The thermal sensation level of the human body 22 is level 4, and hence the controller 9 sets the orientations of the horizontal airflow-direction flap 4 and the vertical airflow-direction flap 5 so that the airflow reaches the foot position of the human body 22, and then adjusts the angle of the horizontal airflow-direction flap 4 to the room center side by 5 degrees to move the airflow reaching position. Thus, the airflow A2 adjusted to the right side from the foot position of the human body 22 present on the left side in the room is formed.

In FIG. 8A and FIG. 8B, there are illustrated the orientation of the horizontal airflow-direction flap 4 and the airflow A3 of a case in which a human body 23 having the thermal sensation level of 5 is present on the back left side in the room. The thermal sensation level of the human body 23 is level 5, and hence the controller 9 sets the orientations of the horizontal airflow-direction flap 4 and the vertical airflow-direction flap 5 so that the airflow reaches the foot position of the human body 23, and then adjusts the angle of the horizontal airflow-direction flap 4 to the room center side by 10 degrees to shift the airflow reaching position. Thus, the airflow A3 adjusted to the right side from the foot position of the human body 23 present on the left side in the room is formed. The airflow A3 reaches a position that is more away from the human body position as compared to the airflow A2 formed for the human body 22 having the thermal sensation level of 4, and hence the airflow A3 provides weaker conditioned air at the human body position.

Description of the control and the operation at the time of heating operation has been given so far, but the storage unit 14 includes a setting table for use at the time of cooling operation similarly to the setting table 30 for use at the time of heating operation. In the setting table for use at the time of cooling operation, for example, the colder feeling the index of the thermal sensation indicates, the higher level value of the thermal sensation level is set, and the larger the required adjustment angle is set. Further, at the time of cooling operation, the controller 9 may perform control illustrated in FIG. 5 similarly to the case at the time of heating operation. At the time of cooling operation, the thermal sensation level determination unit 13 and the airflow-direction and airflow-reaching position control unit 15 may refer to the setting table related to the cooling operation among a plurality of setting tables stored in the storage unit 14. In this manner, for a human body for which the index of the thermal sensation is cold or very cold, the air-conditioning apparatus supplies cold air to a position shifted from a position of the human body. Thus, cooling for a person who feels cold can be weakened.

In Embodiment 1, the air-conditioning apparatus includes the casing 99, the fan 3, the heat exchanger 2, the airflow-direction flap, the human body detection sensor 7 configured to detect the human body information of the indoor space, and the controller 9 configured to control the operation of the airflow-direction flap. The controller 9 includes the position determination unit 12 configured to detect the position of the human body in the indoor space based on the human body information detected by the human body detection sensor 7, the thermal sensation level determination unit 13 configured to determine the thermal sensation level based on the human body information, and the airflow-direction and airflow-reaching position control unit 15 configured to adjust the angle of the airflow-direction flap in accordance with the thermal sensation level determined by the thermal sensation level determination unit 13.

In this manner, the air-conditioning apparatus can change the air-stream control depending on the human body because the airflow reaching position is adjusted in accordance with the thermal sensation level. Therefore, with the air-conditioning apparatus, the user can adjust the intensity of the air conditioning at the position at which the user is present, and comfortable air conditioning can be provided.

Further, the human body detection sensor 7 includes the infrared sensor configured to acquire the thermal image of the indoor space. The position determination unit 12 is configured to detect the human body position based on the thermal image acquired by the human body detection sensor 7. The thermal sensation level determination unit 13 is configured to detect the surface temperature of the human body based on the thermal image to determine the thermal sensation level based on the detected surface temperature.

In this manner, the human body position and the human body surface temperature can be detected with one infrared sensor. Thus, a simplified configuration of the air-conditioning apparatus can be achieved, and the controller 9 can easily process the signal from the sensor and perform control.

Further, the airflow-direction flap includes the horizontal airflow-direction flap 4, which is provided in the middle of the air passage extending from the fan 3 to the air outlet 6 to be turnable in a horizontal direction, and is configured to control the horizontal airflow direction of the airflow to be blown out through the air outlet 6. In this manner, the air-conditioning apparatus drives the horizontal airflow-direction flap 4 so that the horizontal airflow can be changed.

Further, the airflow-direction flap includes the vertical airflow-direction flap 5, which is provided at the air outlet 6 to be turnable in the vertical direction, and is configured to control the vertical airflow direction of the airflow to be blown out through the air outlet 6. In this manner, the air-conditioning apparatus drives the vertical airflow-direction flap 5 so that the vertical airflow can be changed.

Further, the controller 9 includes the storage unit 14 configured to store the setting table 30 in which the human body temperature is classified into a plurality of stages of thermal sensation levels (for example, levels 1 to 5), and the thermal sensation level determination unit 13 is configured to refer to the setting table 30 stored in the storage unit 14 to determine the thermal sensation level corresponding to the detected human body temperature as the thermal sensation level.

According to the above configuration, for the thermal sensation level determination unit 13, referring to the setting table 30 suffices to determine the thermal sensation level, and hence the determination processing is simplified as compared to a case in which calculation or other processing is performed. Further, information required for the determination is managed in a format of a table, and hence, for example, even when the classification of the human body temperature is to be changed, only data of a part of the setting table 30 stored in the storage unit 14 is required to be changed, and thus smaller change of the control flow is needed.

Further, in the setting table 30, the preset adjustment amount and each of the plurality of stages of thermal sensation levels are associated, and the airflow-direction and airflow-reaching position control unit 15 is configured to refer to the setting table 30 to adjust the angle of the airflow-direction flap by the preset adjustment amount corresponding to the thermal sensation level determined by the thermal sensation level determination unit 13.

According to the above configuration, for the airflow-direction and airflow-reaching position control unit 15 referring to the setting table 30 suffices to acquire the adjustment amount required for the human body, and hence the adjustment processing is simplified as compared to a case in which calculation or other processing is performed. Further, the air-conditioning apparatus adjusts the angle of the airflow-direction flap by the preset adjustment amount corresponding to the thermal sensation level, and hence can perform the air-stream control at multiple stages. Therefore, the sense of discomfort of the user due to excessively hot feeling or excessively cold feeling can be reduced, and comfortable air conditioning can be provided.

Further, the airflow-direction and airflow-reaching position control unit 15 is configured to determine the angle of the airflow-direction flap so that the airflow is directed toward the human body position, and adjust the determined angle of the airflow-direction flap by the preset adjustment amount. In this manner, with the human body position being set as a reference, the airflow-direction and airflow-reaching position control unit 15 can bring the airflow reaching position away from the human body position depending on thermal sensation of a person. Therefore, the air-conditioning apparatus can adjust the intensity of air conditioning at the position at which the user is present in accordance with the thermal sensation of the user.

Further, the plurality of stages of thermal sensation levels are set such that the higher the human body temperature is in the heating operation, and are set such that the lower the human body temperature is in the cooling operation, the higher state of the thermal sensation level is set. The preset adjustment amount is set such that the higher the thermal sensation level is high, the larger the preset adjustment amount is set.

In this manner, the air-conditioning apparatus can increase the shift amount of the airflow from the human body position such that the larger the thermal sensation level is, the larger the shift amount is. Therefore, the air-conditioning apparatus can perform the air-stream control so that, for example, at the time of heating operation, the higher the degree of hot feeling a person has, the weaker the heating is performed for the person, and at the time of cooling operation, the higher the degree of cold feeling a person has, the weaker the cooling is performed for the person. Thus, the comfort of the user can be increased.

Further, the preset adjustment amount is set to 0 for the thermal sensation level that is equal to or lower than the preset reference level (for example, level 3). In this manner, the airflow-direction and airflow-reaching position control unit 15 can supply the airflow toward the human body position for the human body having the thermal sensation level that is equal to or lower than the reference level, and can supply the airflow to a position shifted from the human body position for the human body having the thermal sensation level that is higher than the reference level. Therefore, the air-conditioning apparatus can supply the warm air or the cold air to the human body position for, for example, a person who feels comfortable, a person who feels cold at the time of heating operation, or a person who feels hot at the time of cooling operation.

Further, the airflow-direction and airflow-reaching position control unit 15 is configured to adjust the determined angle of the airflow-direction flap by the preset adjustment amount when the thermal sensation level is higher than the preset reference level (for example, level 3). In this manner, the airflow-direction and airflow-reaching position control unit 15 performs, for example, air-stream adjustment for a person who feels hot at the time of heating operation, and performs air-stream adjustment for a person who feels cold at the time of cooling operation. Meanwhile, the airflow-direction and airflow-reaching position control unit 15 sets the airflow direction of the airflow to the human body position without performing the air-stream adjustment for a person who feels comfortable, a person who feels cold at the time of heating operation, or a person who feels hot at the time of cooling operation. Therefore, the air-conditioning apparatus performs the air-stream adjustment only when it is required, thereby omitting needless control, and providing comfortable air conditioning to each person.

Embodiment 2

In Embodiment 1, description has been given of the case in which one airflow is directed from the indoor unit 100 of the air-conditioning apparatus. However, in Embodiment 2, description is given of a case in which the airflow-direction flap is divided into a plurality of airflow-direction flaps to form a plurality of airflows. Parts having like configurations as those of Embodiment 1 are denoted by like reference symbols, and description thereof is omitted.

Figure 9:
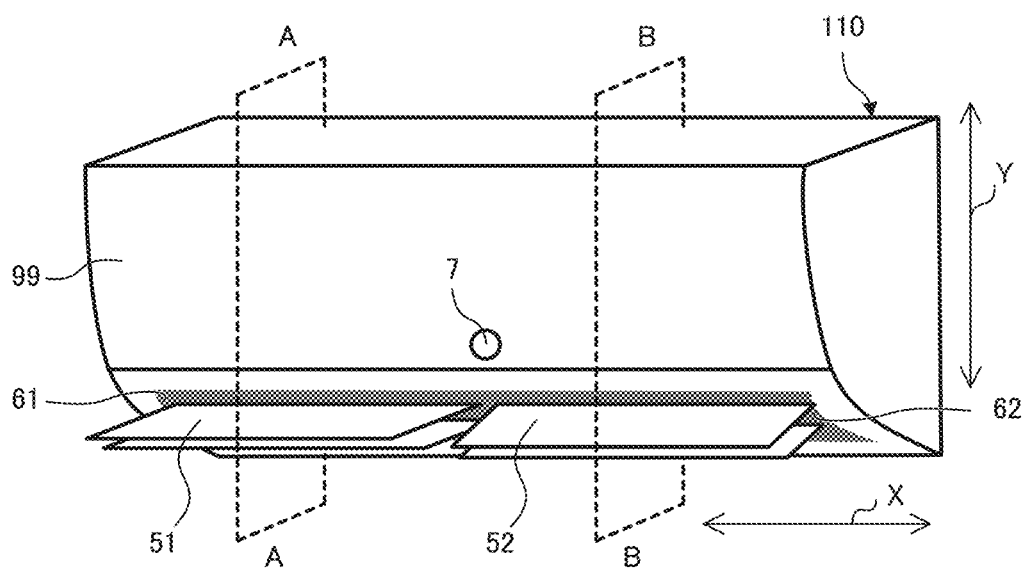
FIG. 9 is a perspective view for illustrating an outer appearance of an indoor unit in Embodiment 2 of the present invention.
Figure 10A:
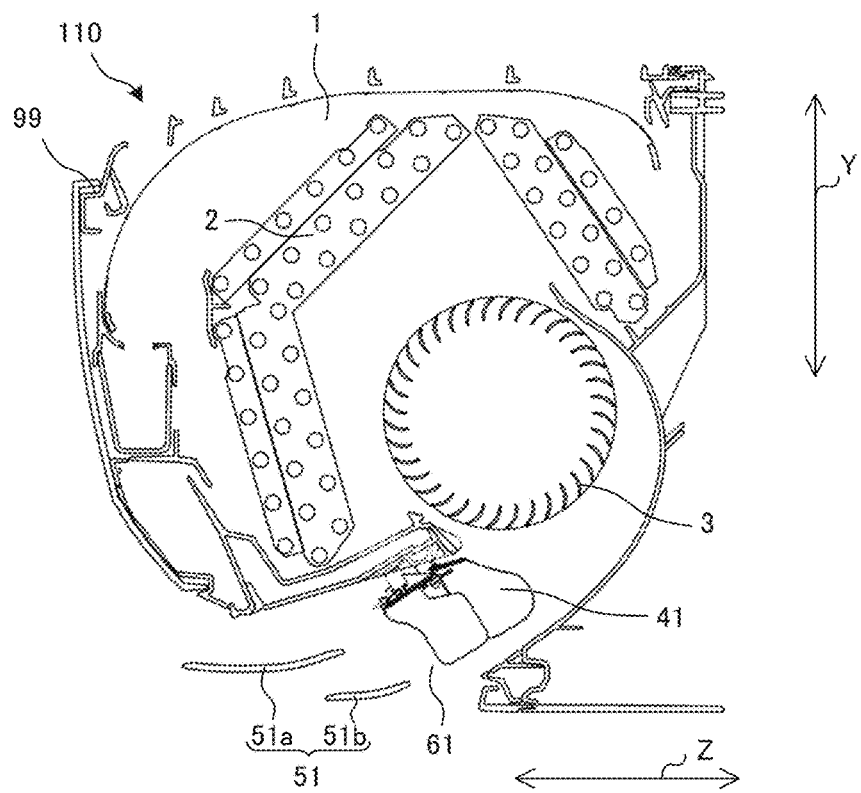
FIG. 10A is a left-side sectional view for illustrating an A-A cross section of the indoor unit of FIG. 9.
Figure 10B:
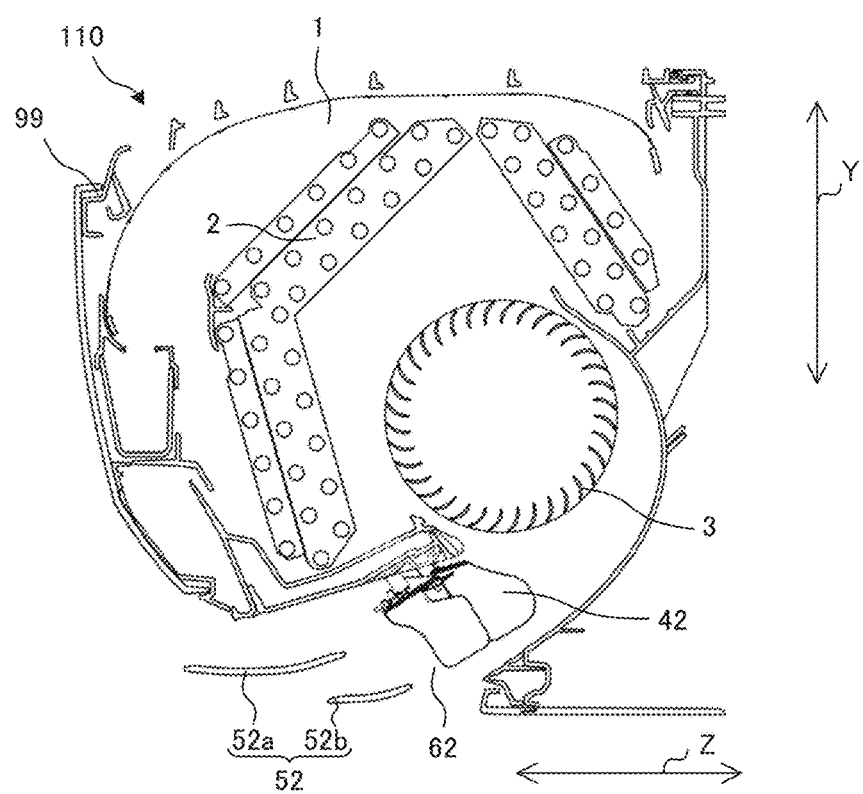
FIG. 10B is a right-side sectional view for illustrating a B-B cross section of the indoor unit of FIG. 9.

FIG. 9 is a perspective view for illustrating an outer appearance of an indoor unit in Embodiment 2 of the present invention. FIG. 10A is a left-side sectional view for illustrating an A-A cross section of the indoor unit of FIG. 9. FIG. 10B is a right-side sectional view for illustrating a B-B cross section of the indoor unit of FIG. 9. Similarly to Embodiment 1, the fan 3 is provided inside the casing 99, and is configured to suck indoor air and blow out conditioned air. The heat exchanger 2 is arranged in an air passage, and is configured to condition the sucked indoor air to generate conditioned air. The casing 99 has the air inlet 1 and the air outlet.

As illustrated in FIG. 9, the airflow-direction flaps are each divided in the horizontal direction (arrow X direction), and the divided airflow-direction flaps are separately driven. A left air outlet 61 is formed on a lower left side of the indoor unit 110, and a right air outlet 62 is formed on a lower right side of an indoor unit 110. In the middle of the air passage extending from the fan 3 to each air outlet, horizontally divided horizontal airflow-direction flaps are provided, and the vertical airflow-direction flap is provided for each air outlet. A left horizontal airflow-direction flap 41 controls the airflow direction of the airflow blown out through the left air outlet 61 in the horizontal direction, and a left vertical airflow-direction flap 51 controls the same in the vertical direction. A right horizontal airflow-direction flap 42 controls the airflow direction of the airflow blown out through the right air outlet 62 in the horizontal direction, and a right vertical airflow-direction flap 52 controls the same in the vertical direction. The left vertical airflow-direction flap 51 includes a vertical airflow-direction flap 51a provided on the front side of the indoor unit 110 in the front-rear direction (arrow Z direction), and a rear vertical airflow-direction flap 51b provided on the rear side thereof. The right vertical airflow-direction flap 52 includes a front vertical airflow-direction flap 52a provided on the front side of the indoor unit 110 in the front-rear direction (arrow Z direction), and a rear vertical airflow-direction flap 52b provided on the rear side thereof. Further, each horizontal airflow-direction flap is formed of a plurality of vanes arrayed in the horizontal direction (arrow X direction).

Further, the air-conditioning apparatus includes the human body detection sensor 7 similarly to Embodiment 1 to acquire human body information of a plurality of human bodies present in the room.

Figure 11:
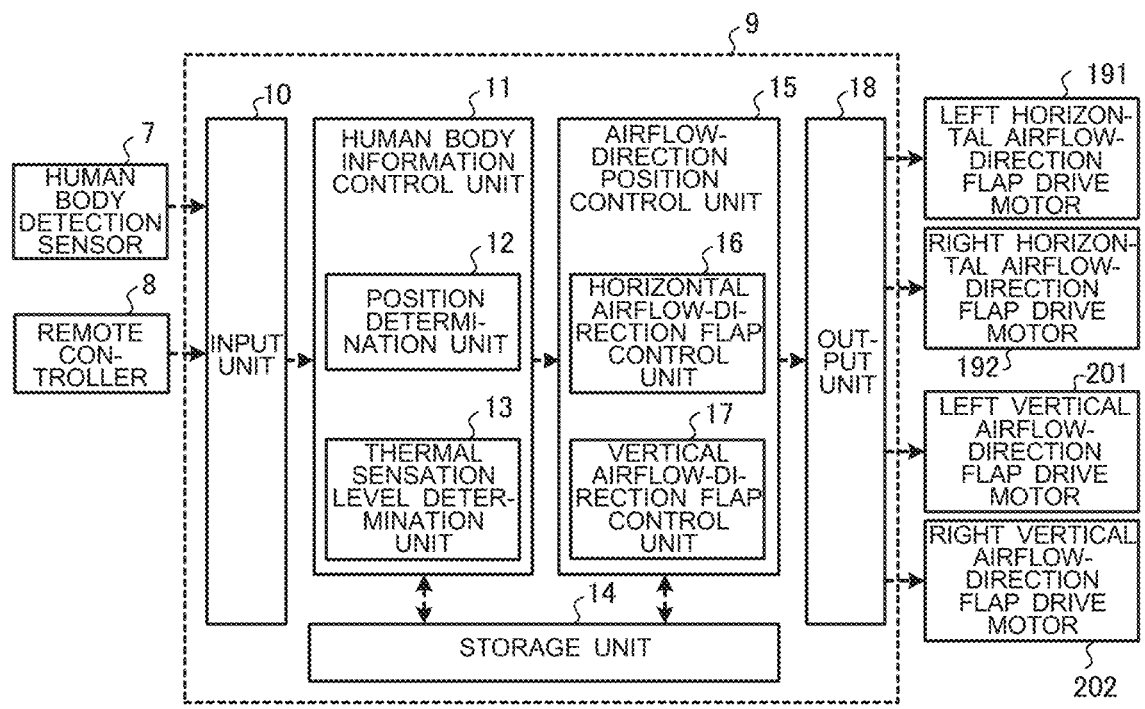
FIG. 11 is a functional block diagram for illustrating a controller in Embodiment 2 of the present invention.

FIG. 11 is a functional block diagram for illustrating a controller in Embodiment 2 of the present invention. Similarly to Embodiment 1, the controller 9 controls the plurality of airflows to be blown out into the room based on signals acquired from, for example, the remote controller 8 and the human body detection sensor 7.

The air-conditioning apparatus according to Embodiment 2 includes a plurality of motors configured to control the respective airflow-direction flaps. A left horizontal airflow-direction flap drive motor 191 drives the left horizontal airflow-direction flap 41, and a left vertical airflow-direction flap drive motor 201 drives the left vertical airflow-direction flap 51. Further, a right horizontal airflow-direction flap drive motor 192 drives the right horizontal airflow-direction flap 42, and a right vertical airflow-direction flap drive motor 202 drives the right vertical airflow-direction flap 52.

The controller 9 includes the input unit 10, the human body information control unit 11, the airflow-direction and airflow-reaching position control unit 15, the storage unit 14, and the output unit 18. The input unit 10 processes input information, for example, operation commands such as an operation mode, setting temperature, setting humidity, and air velocity setting, which are input by a user via the remote controller 8, and the thermal image acquired from the human body detection sensor 7. The human body information control unit 11 acquires the input information from the input unit 10 to determine and process the human body information. The airflow-direction and airflow-reaching position control unit 15 acquires the human body information from the human body information control unit 11 to determine and process an airflow-direction and airflow-reaching position. The storage unit 14 is formed of, for example, a memory, and stores, for example, various control setting values. The output unit 18 acquires control information or other information from the airflow-direction and airflow-reaching position control unit 15 to output the information to an apparatus outside of the controller 9.

The human body information control unit 11 includes the position determination unit 12 and the thermal sensation level determination unit 13, and extracts human body information from the thermal image of the indoor space obtained by the human body detection sensor 7. The position determination unit 12 checks the thermal image of the indoor space against the control setting value stored in the storage unit 14 to determine at which position in the room each of the human bodies is present. The thermal sensation level determination unit 13 determines the thermal sensation level for each of the plurality of human bodies. The thermal sensation level determination unit 13 specifically detects the surface temperature of the human body based on the thermal image to compare the detected human body surface temperature with the setting table 30 stored in the storage unit 14, to thereby determine the thermal sensation level of the detected human body.

The airflow-direction and airflow-reaching position control unit 15 includes the horizontal airflow-direction flap control unit 16 and the vertical airflow-direction flap control unit 17, and sets the airflow-direction and airflow-reaching position based on information such as a plurality of human body positions and a plurality of thermal sensation levels acquired from the human body information control unit 11. The airflow-direction and airflow-reaching position control unit 15 assigns the airflow-direction flap so that an airflow is formed for each human body. The horizontal airflow-direction flap control unit 16 refers to the control setting value stored in the storage unit 14 to determine the angle of the left horizontal airflow-direction flap 41 and the angle of the right horizontal airflow-direction flap 42 so that the airflow-direction and airflow-reaching position set by the airflow-direction and airflow-reaching position control unit 15 is achieved. Similarly to the horizontal airflow-direction flap control unit 16, the vertical airflow-direction flap control unit 17 also refers to the control setting value stored in the storage unit 14 to determine the angle of the left vertical airflow-direction flap 51 and the angle of the right vertical airflow-direction flap 52.

When the output unit 18 acquires the information related to the airflow-direction control from the airflow-direction and airflow-reaching position control unit 15, the output unit 18 outputs a control signal to each of the left horizontal airflow-direction flap drive motor 191, the left vertical airflow-direction flap drive motor 201, the right horizontal airflow-direction flap drive motor 192, and the right vertical airflow-direction flap drive motor 202. The rotation speed of each airflow-direction flap drive motor is controlled by the control signal received from the controller 9.

Figure 12:
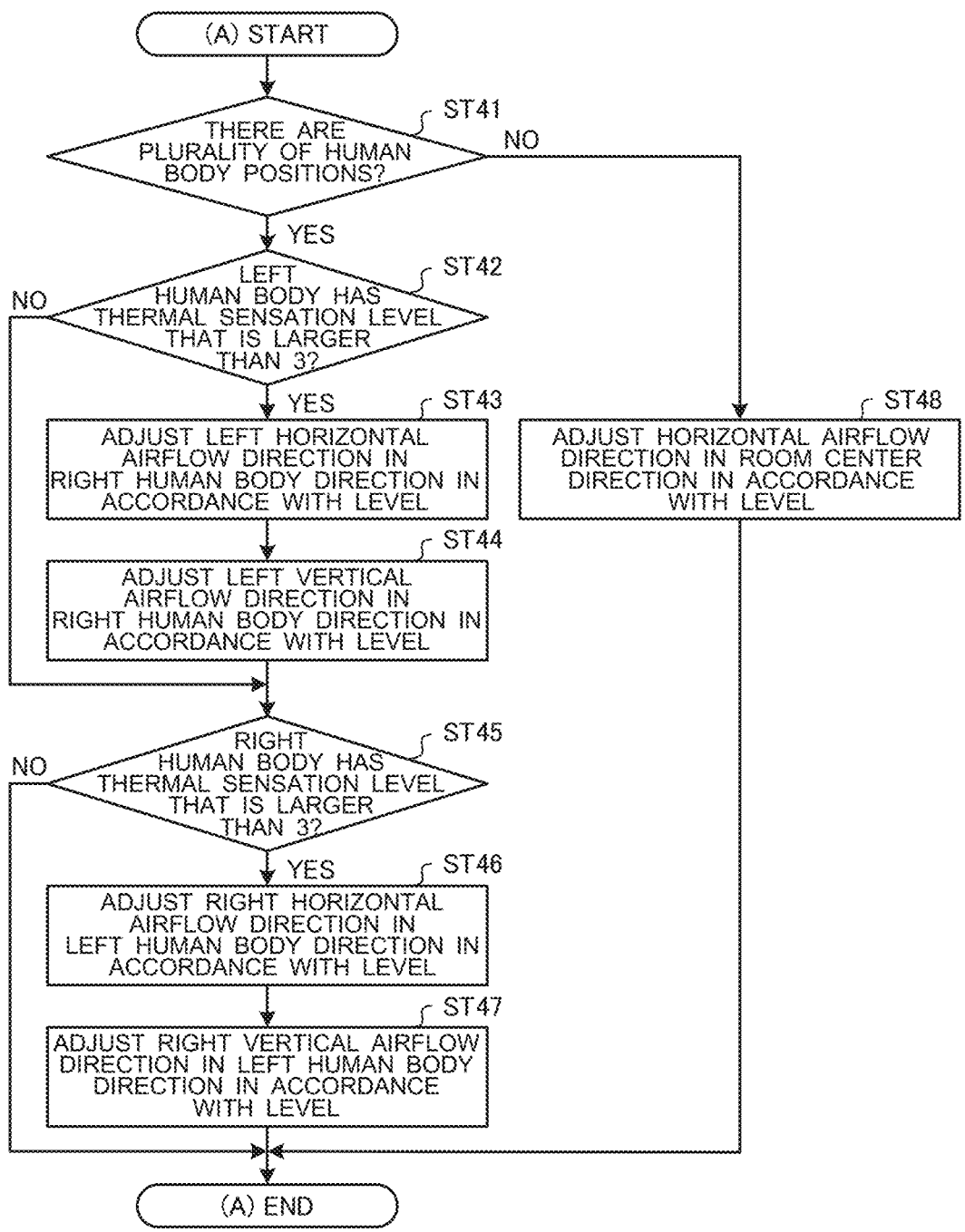
FIG. 12 is a flow chart for illustrating adjustment control to be performed by the controller in Embodiment 2 of the present invention.

FIG. 12 is a flow chart for illustrating adjustment control to be performed by the controller in Embodiment 2 of the present invention. With reference to FIG. 5 and FIG. 12, description is given of control to be performed by the controller 9 when the air-conditioning apparatus is operated to perform heating operation. First, based on the thermal image acquired by the human body detection sensor 7, the position determination unit 12 determines a position at which a human body is present in the room, and the thermal sensation level determination unit 13 determines the thermal sensation level of the human body from the surface temperature of the human body (Step ST1). When a plurality of human bodies are present, each human body position and the thermal sensation level of each human body are determined.

Next, the horizontal airflow-direction flap and the vertical airflow-direction flap are controlled by the control signals from the respective airflow-direction control units, and a reaching point of warm air blown out into the room is directed to the human body position obtained in Step ST1. When a plurality of human bodies are present, for example, the airflow-direction and airflow-reaching position control unit 15 drives the left horizontal airflow-direction flap 41 and the left vertical airflow-direction flap 51 for the human body present on the left side of the indoor unit 110, and sets the airflow reaching position to the left human body position for air conditioning. Further, the airflow-direction and airflow-reaching position control unit 15 drives the right horizontal airflow-direction flap 42 and the right vertical airflow-direction flap 52 for the human body present on the right side, and sets the airflow reaching position to the right human body position for air conditioning (Step ST2).

Next, the airflow-direction and airflow-reaching position control unit 15 determines whether or not the thermal sensation level determined by the thermal sensation level determination unit 13 is higher than level 3 (Step ST3). That is, the airflow-direction and airflow-reaching position control unit 15 determines whether or not the index of the thermal sensation is an index indicating that the person feels hot rather than comfortable. When a plurality of human bodies are present, it is determined whether or not there is a thermal sensation level that is larger than level 3 among the plurality of thermal sensation levels for the plurality of human bodies.

When there is a thermal sensation level that is larger than level 3 among the plurality of thermal sensation levels (Step ST3; YES), the airflow-direction and airflow-reaching position control unit 15 determines whether or not there are a plurality of human body positions (Step ST41). When there are a plurality of human body positions (Step ST41; YES), the airflow-direction and airflow-reaching position control unit 15 proceeds to Step ST42, and determines whether or not the airflow-direction adjustment is required for each human body after Step ST42.

In Step ST42, the airflow-direction and airflow-reaching position control unit 15 determines whether or not the thermal sensation level of the left human body is larger than 3. When it is determined that the thermal sensation level is larger than level 3 (Step ST42; YES), the horizontal airflow direction of the left airflow is adjusted in accordance with the thermal sensation level (Step ST43), and the vertical airflow direction of the left airflow is adjusted in accordance with the thermal sensation level (Step ST44).

In Step ST43, the angle of the left horizontal airflow-direction flap 41 is adjusted in, for example, the direction of one human body, that is, the direction of the right human body position. As shown in FIG. 4, the adjustment angle is stored in advance in the storage unit 14 to be associated with the thermal sensation level. For example, when the thermal sensation level of the left human body is 4, the left airflow is adjusted by 5 degrees in a direction of approaching the right human body position. In Step ST44, the left vertical airflow-direction flap 51 is adjusted in the direction of the right human body position. Similarly to the horizontal airflow-direction flap 41, the adjustment angle of the vertical airflow-direction flap 51 is stored in advance in the storage unit 14. For example, when the thermal sensation level of the left human body is 4, the left airflow is adjusted by 5 degrees in the direction of approaching the right human body position.

Next, in Step ST45, the airflow-direction and airflow-reaching position control unit 15 determines whether or not the thermal sensation level of the right human body is larger than 3. When it is determined that the thermal sensation level is larger than level 3 (Step ST45; YES), the horizontal airflow direction of the right airflow is adjusted in accordance with the thermal sensation level (Step ST46), and the vertical airflow direction of the right airflow is adjusted in accordance with the thermal sensation level (Step ST47).

In Step ST46, the angle of the right horizontal airflow-direction flap 42 is adjusted in, for example, the direction of an other human body, that is, the direction of the left human body position. The adjustment angle is stored in advance in the storage unit 14 to be associated with the thermal sensation level in the setting table 30. For example, when the thermal sensation level of the right human body is 4, the right airflow is adjusted by 5 degrees in a direction of approaching the left human body position. In Step ST47, the right vertical airflow-direction flap 52 is adjusted in the direction of the left human body position. Similarly to the horizontal airflow-direction flap 42, the adjustment angle of the vertical airflow-direction flap 52 is stored in advance in the storage unit 14. For example, when the thermal sensation level of the right human body is 4, the right airflow is adjusted by 5 degrees in the direction of approaching the left human body position.

Meanwhile, when the number of human body positions is one in Step ST41 (Step ST41; NO), the airflow-direction and airflow-reaching position control unit 15 adjusts the angles of the left horizontal airflow-direction flap 41 and the right horizontal airflow-direction flap 42 in the room center direction in accordance with the thermal sensation level (Step ST48). In this case, the adjustment of Embodiment 2 is the same as the operation in Embodiment 1.

After the processing of Step ST47 or Step ST48 ends, the control proceeds to Step ST5 so that the airflow direction is determined. The left horizontal airflow-direction flap drive motor 191 drives the left horizontal airflow-direction flap 41, and the left vertical airflow-direction flap drive motor 201 drives the left vertical airflow-direction flap 51, so that the warm-air reaching position is shifted from the left human body position by an amount corresponding to the thermal sensation level of the left human body. Further, the right horizontal airflow-direction flap drive motor 192 drives the right horizontal airflow-direction flap 42, and the right vertical airflow-direction flap drive motor 202 drives the right vertical airflow-direction flap 52, so that the warm-air reaching point is shifted from the right human body position by an amount corresponding to the thermal sensation level of the right human body.

When the air-conditioning apparatus is operated to perform heating operation, the controller 9 repeatedly executes the control flow of FIG. 5 and FIG. 12 described above, and thus the airflow direction of the airflow is adjusted in accordance with, for example, the position or the thermal sensation level of the human body. Description has been given of control at the time of heating operation with reference to FIG. 5 and FIG. 12. However, similarly to Embodiment 1, at the time of cooling operation, the thermal sensation level determination unit 13 and the airflow-direction and airflow-reaching position control unit 15 may refer to the setting table related to the cooling operation among the plurality of setting tables stored in the storage unit 14.

Figure 13A:
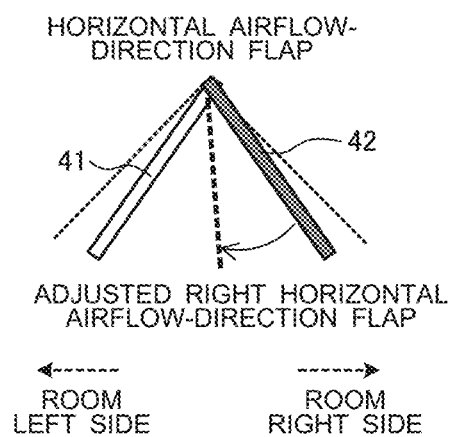
FIG. 13A is a schematic view for illustrating a method of adjusting a horizontal airflow-direction flap in Embodiment 2 of the present invention.
Figure 13B:
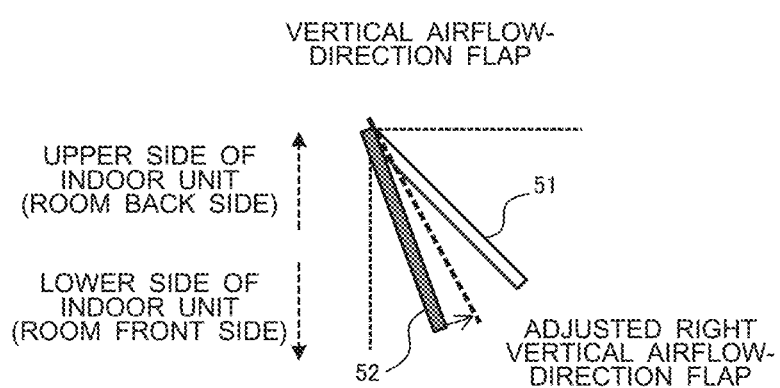
FIG. 13B is a schematic view for illustrating a method of adjusting a vertical airflow-direction flap in Embodiment 2 of the present invention.

FIG. 13A is a schematic view for illustrating a method of adjusting the horizontal airflow-direction flap in Embodiment 2 of the present invention. FIG. 13B is a schematic view for illustrating a method of adjusting the vertical airflow-direction flap in Embodiment 2 of the present invention. With reference to FIG. 13A and FIG. 13B, description is given of the operation of each airflow-direction flap performed when the airflow direction of the airflow is adjusted. In FIG. 13A and FIG. 13B, the adjustment direction is indicated by the solid-line arrow.

First, the angles of the left horizontal airflow-direction flap 41 and the right horizontal airflow-direction flap 42 are determined so that the left horizontal airflow-direction flap 41 and the right horizontal airflow-direction flap 42 are directed to the detected left human body position and the detected right human body position, respectively. Then, when the thermal sensation level of the right human body is larger than level 3, and thus the adjustment is to be performed, the right horizontal airflow-direction flap 42 is adjusted by a predetermined angle (for example, 5 degrees) in the direction of approaching the other human body, that is, the direction of the left horizontal airflow-direction flap 41. Similarly, first, the angles of the left vertical airflow-direction flap 51 and the right vertical airflow-direction flap 52 are determined so that the left vertical airflow-direction flap 51 and the right vertical airflow-direction flap 52 are directed to the detected left human body position and the detected right human body position, respectively. Then, when the thermal sensation level of the right human body is larger than level 3, and thus the adjustment is to be performed, the right vertical airflow-direction flap 52 is adjusted by a predetermined angle (for example, 5 degrees) in the direction of approaching the other human body, that is, the direction of the left vertical airflow-direction flap 51. As for the left human body as well as the right human body, the left horizontal airflow-direction flap 41 and the left vertical airflow-direction flap 51 are controlled in accordance with the thermal sensation level.

Figure 14A:
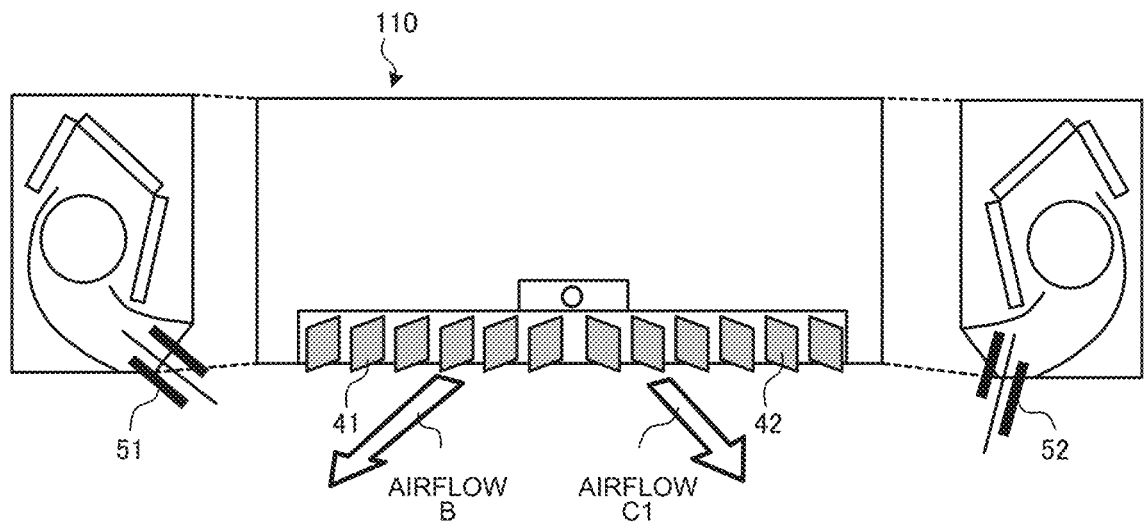
FIG. 14A is an explanatory view for illustrating the indoor unit in Usage Example 1 of the vertical airflow-direction flap and the horizontal airflow-direction flap in Embodiment 2 of the present invention.
Figure 14B:
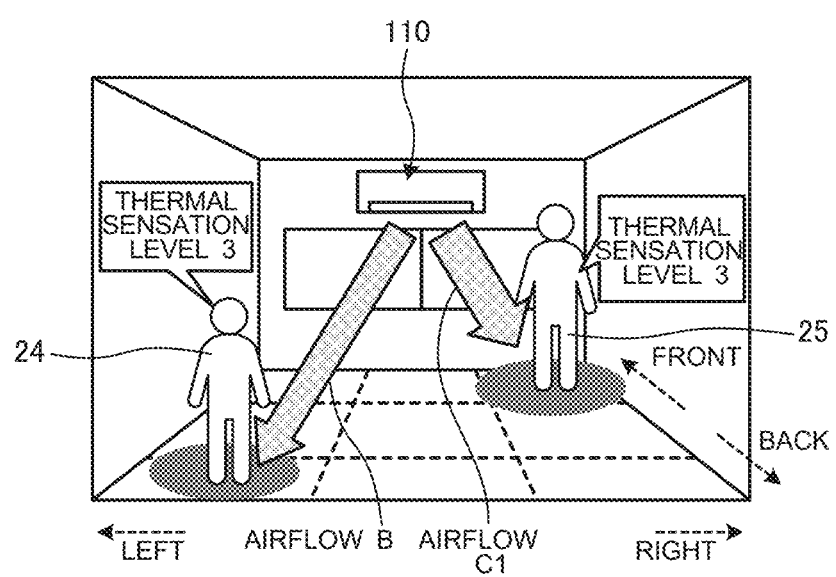
FIG. 14B is a schematic view for illustrating an inside of a room in Usage Example 1 of FIG. 14A.
Figure 15A:
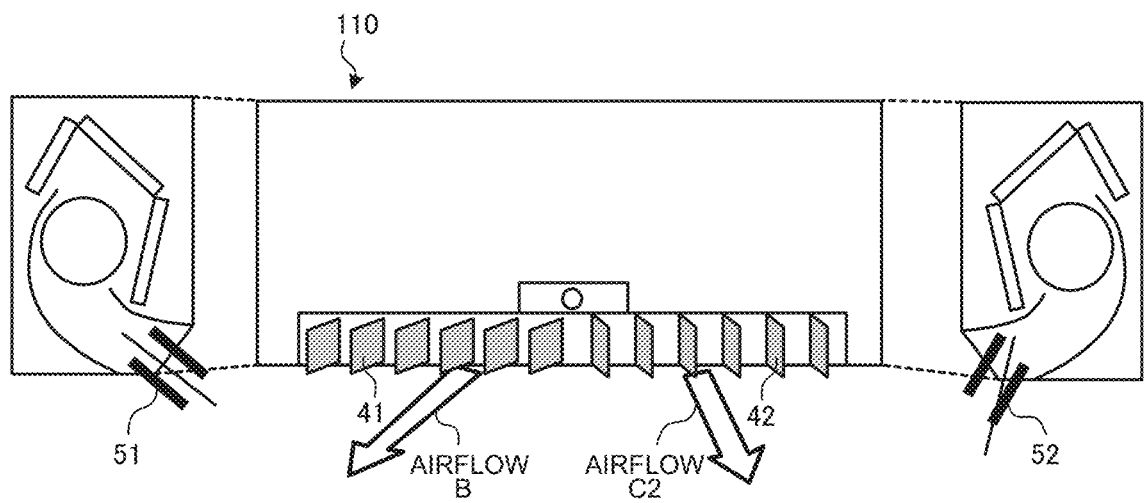
FIG. 15A is an explanatory view for illustrating the indoor unit in Usage Example 2 of the vertical airflow-direction flap and the horizontal airflow-direction flap in Embodiment 2 of the present invention.
Figure 15B:
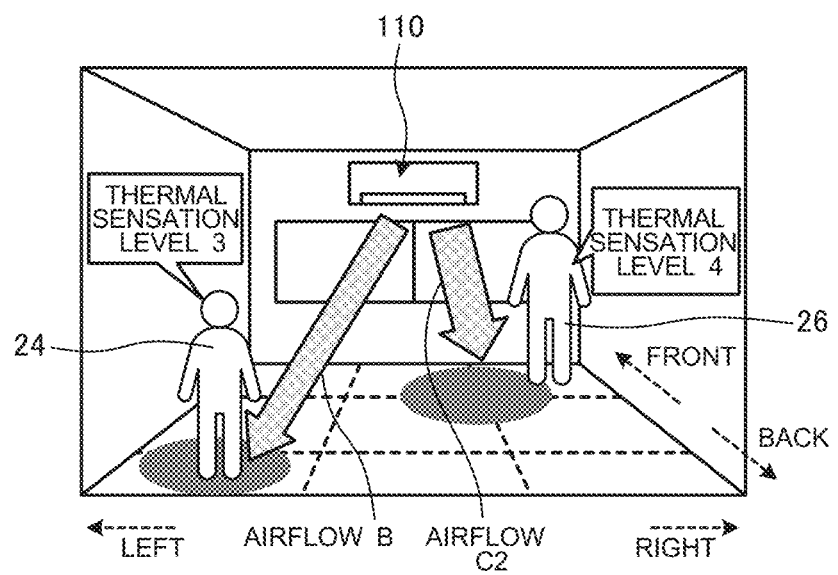
FIG. 15B is a schematic view for illustrating an inside of the room in Usage Example 2 of FIG. 15A.
Figure 16A:
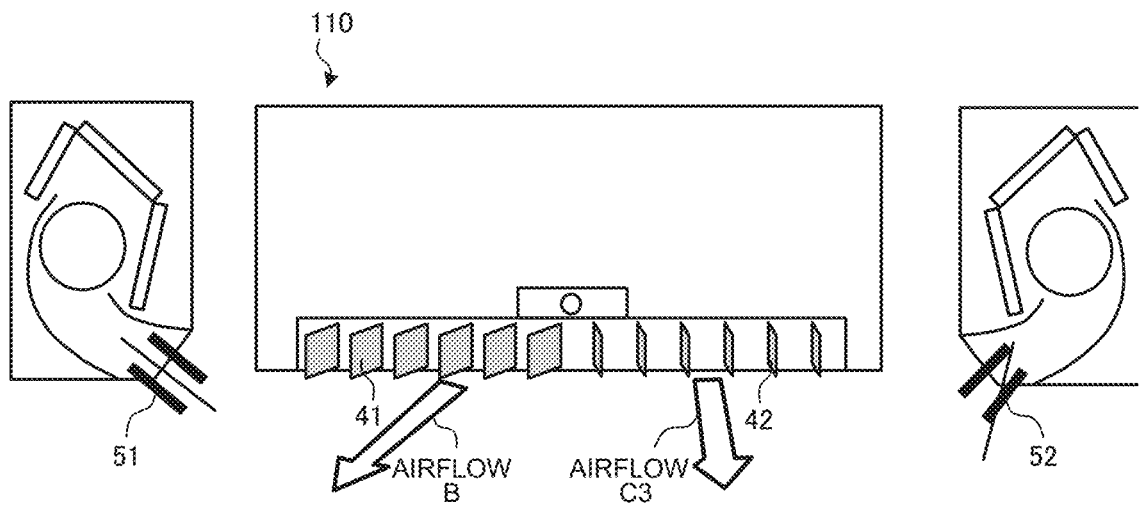
FIG. 16A is an explanatory view for illustrating the indoor unit in Usage Example 3 of the vertical airflow-direction flap and the horizontal airflow-direction flap in Embodiment 2 of the present invention.
Figure 16B:
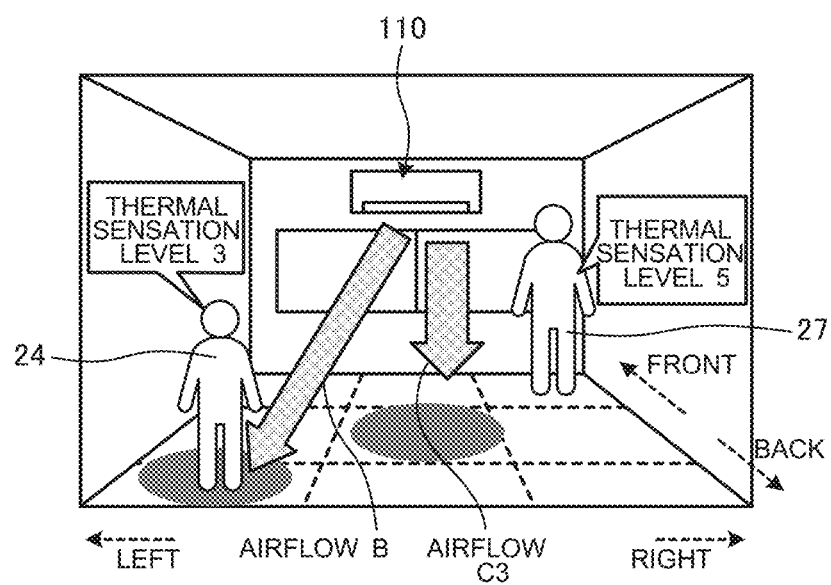
FIG. 16B is a schematic view for illustrating an inside of the room in Usage Example 3 of FIG. 16A.

Next, with reference to FIG. 14A to FIG. 16B, description is given of the airflow to be blown out into the room from the indoor unit 110. FIG. 14A is an explanatory view for illustrating the indoor unit in Usage Example 1 of the vertical airflow-direction flap and the horizontal airflow-direction flap in Embodiment 2 of the present invention. FIG. 14B is a schematic view for illustrating an inside of a room in Usage Example 1 of the vertical airflow-direction flap and the horizontal airflow-direction flap in Embodiment 2 of the present invention. FIG. 15A is an explanatory view for illustrating the indoor unit in Usage Example 2 of the vertical airflow-direction flap and the horizontal airflow-direction flap in Embodiment 2 of the present invention. FIG. 15B is a schematic view for illustrating an inside of the room in Usage Example 2 of the vertical airflow-direction flap and the horizontal airflow-direction flap in Embodiment 2 of the present invention. FIG. 16A is an explanatory view for illustrating the indoor unit in Usage Example 3 of the vertical airflow-direction flap and the horizontal airflow-direction flap in Embodiment 2 of the present invention. FIG. 16B is a schematic view for illustrating an inside of the room in Usage Example 3 of the vertical airflow-direction flap and the horizontal airflow-direction flap in Embodiment 2 of the present invention. FIG. 14A, FIG. 15A, and FIG. 16A are a schematic left sectional view, a schematic front view, and a schematic right sectional view of the indoor unit 110.

The controller 9 operates the left horizontal airflow-direction flap 41, the left vertical airflow-direction flap 51, the right horizontal airflow-direction flap 42, and the right vertical airflow-direction flap 52 in accordance with the thermal sensation levels of the plurality of human bodies, to thereby enable air-stream control to be performed to obtain such airflows B, C1, C2, and C3 as indicated by the arrows in FIG. 14A to FIG. 16B, for example.

In FIG. 14A and FIG. 14B, there are illustrated the left vertical airflow-direction flap 51, the left horizontal airflow-direction flap 41, the right vertical airflow-direction flap 52, and the right horizontal airflow-direction flap 42 of a case in which a human body 24 having the thermal sensation level of 3 is present on the back left side in the room and a human body 25 having the thermal sensation level of 3 is also present on the right side. The left horizontal airflow-direction flap 41 and the left vertical airflow-direction flap 51 are controlled so that the airflow B reaching the foot position of the human body 24 is formed. Further, the right horizontal airflow-direction flap 42 and the right vertical airflow-direction flap 52 are controlled so that the airflow C1 reaching the foot position of the human body 25 is formed. Both of the human body 24 and the human body 25 have the thermal sensation level of level 3, and hence adjustment of the airflow direction of the airflow is not executed.

In FIG. 15A and FIG. 15B, there are illustrated the left vertical airflow-direction flap 51, the left horizontal airflow-direction flap 41, the right vertical airflow-direction flap 52, and the right horizontal airflow-direction flap 42 of a case in which a human body 24 having the thermal sensation level of 3 is present on the back left side in the room and a human body 26 having the thermal sensation level of 4 is also present on the right side. The left horizontal airflow-direction flap 41 and the left vertical airflow-direction flap 51 are controlled so that the airflow B reaching the foot position of the human body 24 is formed. The thermal sensation level of the human body 24 is level 3, and hence adjustment of the airflow direction of the left airflow is not executed. Meanwhile, the thermal sensation level of the right human body 26 is level 4, and hence after the air-stream reaching point is set to the foot position of the human body 26, the angles of the right horizontal airflow-direction flap 42 and the right vertical airflow-direction flap 52 are adjusted toward the other left human body 24. That is, the airflow C2 shifted from the foot position of the human body 26 to the back left side in the room is formed.

In FIG. 16A and FIG. 16B, there are illustrated the left vertical airflow-direction flap 51, the left horizontal airflow-direction flap 41, the right vertical airflow-direction flap 52, and the right horizontal airflow-direction flap 42 of a case in which a human body 24 having the thermal sensation level of 3 is present on the back left side in the room and a human body 27 having the thermal sensation level of 5 is also present on the right side. The left horizontal airflow-direction flap 41 and the left vertical airflow-direction flap 51 are controlled so that the airflow B reaching the foot position of the human body 24 is formed. The thermal sensation level of the human body 24 is level 3, and hence adjustment of the airflow direction of the left airflow is not executed. Meanwhile, the thermal sensation level of the right human body 27 is level 5, and hence after the air-stream reaching point is set to the foot position of the human body 27, the angles of the right horizontal airflow-direction flap 42 and the right vertical airflow-direction flap 52 are adjusted toward the other left human body 24. That is, the airflow C3 shifted from the foot position of the human body 27 to the back left side in the room is formed. The airflow C3 is farther from the human body 27 in the room and closer to the other human body 24 as compared to the airflow C2 formed for the human body 26 having the thermal sensation level of 4.

In Embodiment 2, the airflow-direction flap of the air-conditioning apparatus is divided into a plurality of airflow-direction flaps to control the airflow directions of the plurality of airflows B and C1 to C3. The human body detection sensor is configured to detect the plurality of human body information pieces in the indoor space. The position determination unit 12 is configured to detect the human body position for each of the plurality of human body information pieces. The thermal sensation level determination unit 13 is configured to determine the thermal sensation level for each of the plurality of human body information pieces. The airflow-direction and airflow-reaching position control unit 15 is configured to assign the plurality of airflow-direction flaps to a plurality of the human body positions to adjust the angle of the airflow-direction flap assigned to the human body position in accordance with the thermal sensation level of the human body related to each human body position.

In this manner, the air-conditioning apparatus assigns the plurality of divided airflow-direction flaps to the air-stream control for the plurality of human body positions so that air-stream control similar to that in Embodiment 1 can be performed for each person even when a plurality of people are present in the room. The airflow reaching position is controlled in accordance with the thermal sensation level of each person, and hence even when a plurality of users are present and each user has different thermal sensation, the heating intensity can be adjusted depending on the human body position. Therefore, the air-conditioning apparatus can reduce the sense of discomfort due to excessively hot feeling or excessively cold feeling, and perform air conditioning comfortable for each user.

Further, when the airflow-direction and airflow-reaching position control unit 15 adjusts the angle of the airflow-direction flap (for example, the right horizontal airflow-direction flap 42 and the right vertical airflow-direction flap 52) assigned to the human body position (for example, the position of the right human body 26), the airflow-direction and airflow-reaching position control unit 15 performs adjustment in a direction of an other human body position (for example, the position of the left human body 24) different from the human body position. In this manner, the airflow that is not required for one human body can be used for air conditioning for an other human body. Further, the airflow direction of the airflow is prevented from being directed in a direction in which no one is present, and hence the conditioned air can be used without waste.

Embodiments of the present invention are not limited to Embodiments 1 and 2 described above, and various modifications can be made thereto. For example, description has been made of the case in which the body surface temperature is detected as the human body temperature, and the thermal sensation level is determined based on the surface temperature. However, there may be employed a configuration in which the thermal sensation level is determined based on blown-out temperature of the airflow, air temperature or humidity around a human body, or the intensity of solar radiation, for example.

Further, in the setting table 30 of FIG. 4, the thermal sensation level is set to have five stages. However, the thermal sensation level is only required to have a plurality of stages including two or more stages. Further, the adjustment angle may be stored in the storage unit 14 as an expression instead of the format of a table.

Further, description has been given of the case in which the amount for adjustment (adjustment amount) used when the angle of the airflow-direction flap is adjusted is determined with use of an angle. However, the adjustment amount may be determined with use of, for example, a displacement amount of the position of the airflow-direction flap, a rotation step of the drive motor, or a rotation time of each drive motor.

Further, description has been given of the case in which the direction of adjusting the airflow is the room center direction or the direction of an other human body. However, the present invention is not limited thereto. For example, the controller 9 may recognize a floor surface of the room in a divided manner in the horizontal direction and a depth direction of the indoor unit 100, and at the time of adjustment, may adjust the airflow direction of the airflow so that the airflow is moved between the divided areas.

Further, description has been given of the case in which each airflow-direction flap control unit causes each drive motor to separately execute the drive of the airflow-direction flap toward the human body position and the drive of the airflow-direction flap for movement from the human body position. However, there may be employed a configuration in which the airflow-direction flap is driven at a time at an angle obtained after the adjustment angle is applied.

Further, description has been given of the configuration in which, when a plurality of human bodies are present, the thermal sensation level is determined for each human body, and the horizontal airflow direction and the vertical airflow direction of the airflow-direction flap assigned as one for determining the airflow for each human body are adjusted. However, the present invention is not limited thereto. The controller may adjust the horizontal airflow direction and the vertical airflow direction in accordance with, for example, a difference in thermal sensation level between the left human body and the right human body.

Further, description has been given of the case in which the horizontal airflow-direction flap is adjusted, or both of the horizontal airflow-direction flap and the vertical airflow-direction flap are adjusted. However, there may be employed a configuration in which the vertical airflow-direction flap is adjusted. Any configuration may be employed as long as the airflow can be shifted from the human body position.

Further, when a plurality of human bodies are detected and both of the horizontal airflow-direction flap and the vertical airflow-direction flap are to be adjusted, the ratio of the adjustment angle to be applied to the horizontal airflow-direction flap and the vertical airflow-direction flap may be changed depending on the direction of an other human body.

Further, description has been given of the case in which the human body detection sensor 7 is formed of one infrared sensor, and the controller 9 acquires the human body information such as the human body position and the human body temperature from the thermal image. However, for example, the human body detection sensor 7 may be configured by combining, for example, a charge coupled device (CCD) image sensor with other sensors.

The invention claimed is:

1. An air-conditioning apparatus, comprising:
a casing having an air inlet and an air outlet;
a fan, which is provided inside the casing, and is configured to suck air in an indoor space through the air inlet and blow out the air through the air outlet;
a heat exchanger, which is provided inside the casing, and is configured to condition the air sucked through the air inlet;
an airflow-direction flap configured to control an airflow direction of an airflow to be blown out through the air outlet;
a human body detection sensor configured to detect human body information in the indoor space, including human body surface temperature; and
a controller configured to
store a setting table in which a human body temperature is classified into a plurality of stages of predetermined thermal sensation levels;
control an operation of the airflow-direction flap;
detect a position of a human body in the indoor space based on the human body information detected;
refer to the setting table to determine a thermal sensation level of the human body that corresponds to the human body surface temperature;
wherein the thermal sensation level is set such that, for a heating operation, the higher a degree of hot feeling indicated by a predetermined index indicating thermal sensation of a person, the higher a level value for the thermal sensation level is set; and
adjust, when the thermal sensation level is higher than a preset reference level in the heating operation, an angle of the airflow-direction flap according to the thermal sensation level such that an airflow reaching position at which the airflow reaches the human body is away from the position of the human body, and such that the greater a difference between the thermal sensation level and the preset reference level, the greater a distance from the position of the human body to the airflow reaching position.

2. The air-conditioning apparatus of claim 1,
wherein the human body detection sensor includes an infrared sensor configured to acquire a thermal image of the indoor space,
wherein the controller is configured to detect the human body position based on the thermal image acquired by the human body detection sensor, and
wherein the controller is configured to detect a surface temperature of the human body based on the thermal image to determine the thermal sensation level based on the detected surface temperature.

3. The air-conditioning apparatus of claim 1, wherein the airflow-direction flap includes a horizontal airflow-direction flap, which is provided in a middle of an air passage extending from the fan to the air outlet to be turnable in a horizontal direction, and is configured to control a horizontal airflow direction of the airflow to be blown out through the air outlet.

4. The air-conditioning apparatus of claim 1, wherein the airflow-direction flap includes a vertical airflow-direction flap, which is provided at the air outlet to be turnable in a vertical direction, and is configured to control a vertical airflow direction of the airflow to be blown out through the air outlet.

5. The air-conditioning apparatus of claim 1,
wherein the controller is configured to
detect a temperature of the human body based on the human body information, and refer to the setting table to determine the thermal sensation level corresponding to the detected human body temperature as the thermal sensation level.

6. The air-conditioning apparatus of claim 5,
wherein, in the setting table, a preset adjustment amount and each of the plurality of stages of thermal sensation levels are associated, and
wherein the controller is configured to refer to the setting table to adjust the angle of the airflow-direction flap by the preset adjustment amount corresponding to the thermal sensation level determined.

7. The air-conditioning apparatus of claim 6, wherein the controller is configured to determine the angle of the airflow-direction flap so that the airflow is directed toward the human body position, and adjust the determined angle of the airflow-direction flap by the preset adjustment amount.

8. The air-conditioning apparatus of claim 7,
wherein the plurality of stages of thermal sensation levels are set such that, for a heating operation, the higher the human body temperature, the higher the thermal sensation levels are set and
wherein the preset adjustment amount is set such that the higher the thermal sensation level, the larger the preset adjustment amount.

9. The air-conditioning apparatus of claim 8, wherein the preset adjustment amount is set to 0 for the thermal sensation level that is equal to or lower than the preset reference level.

10. The air-conditioning apparatus of claim 8, wherein the controller is configured to adjust the determined angle of the airflow-direction flap by the preset adjustment amount when the thermal sensation level is higher than the preset reference level.

11. The air-conditioning apparatus of claim 1,
wherein the airflow-direction flap is divided into a plurality of airflow-direction flaps to control airflow directions of a plurality of airflows,
wherein the human body detection sensor is configured to detect a plurality of human body information pieces in the indoor space,
wherein the controller is configured to detect the human body position for each of the plurality of human body information pieces,
wherein the controller is configured to determine the thermal sensation level for each of the plurality of human body information pieces, and
wherein the controller is configured to assign the plurality of airflow-direction flaps to a plurality of the human body positions to adjust the angle of the airflow-direction flap assigned to the human body position in accordance with the thermal sensation level related to the human body position.

12. The air-conditioning apparatus of claim 11, wherein, when the controller adjusts the angle of the airflow-direction flap assigned to the human body position, the controller performs adjustment to a direction of an other human body position different from the human body position.

13. The air-conditioning apparatus of claim 1, wherein the thermal sensation level is set such that, for a cooling operation, the higher a degree of cold feeling indicated by the index indicating thermal sensation of the person, the higher the level value for the thermal sensation level is set, the controller adjusts, when the thermal sensation level is higher than the preset reference level in the cooling operation, the angle of the airflow-direction flap such that the airflow reaching position at which the airflow reaches the human body is away from the position of the human body, and such that the greater the difference between the thermal sensation level and the preset reference level, the greater the distance from the position of the human body to the airflow reaching position.

14. The air-conditioning apparatus of claim 13, wherein the controller is configured to
   detect the temperature of the human body based on the human body information, and
   refer to the setting table which is stored to determine the thermal sensation level corresponding to the detected human body temperature as the thermal sensation level.

15. The air-conditioning apparatus of claim 14,
   wherein, in the setting table, a preset adjustment amount and each of the plurality of stages of thermal sensation levels are associated, and
   wherein the controller is configured to refer to the setting table to adjust the angle of the airflow-direction flap by the preset adjustment amount corresponding to the thermal sensation level determined by the controller.

16. The air-conditioning apparatus of claim 15, wherein the controller is configured to determine the angle of the airflow-direction flap so that the airflow is directed toward the human body position, and adjust the determined angle of the airflow-direction flap by the preset adjustment amount.

17. The air-conditioning apparatus of claim 16, wherein the plurality of stages of thermal sensation levels are set such that, for the cooling operation, the lower the degree of cold feeling indicated by the index indicating thermal sensation of the person, the lower the level value for the thermal sensation level is set.

* * * * *